(Model.)
J. A. SMITH & A. J. ATHAY.
OBJECT LENS FOR TELESCOPES AND CAMERAS.
No. 318,666. Patented May 26, 1885.
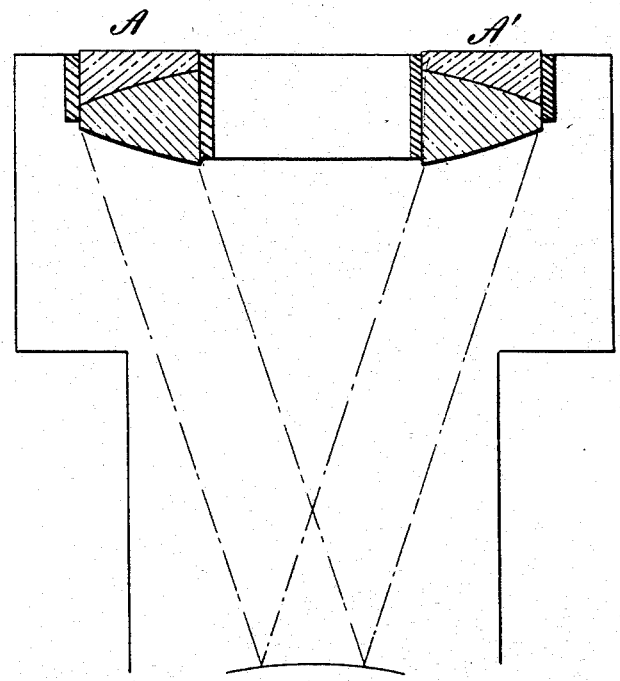
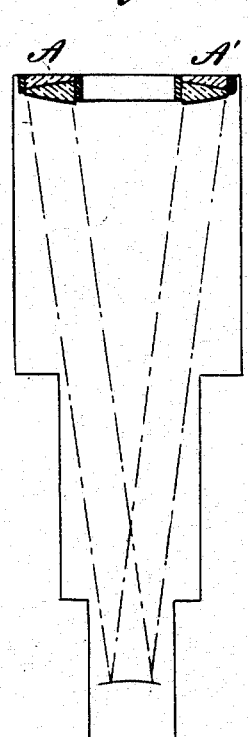
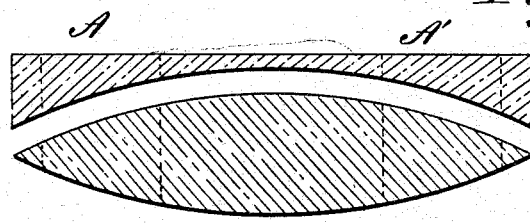
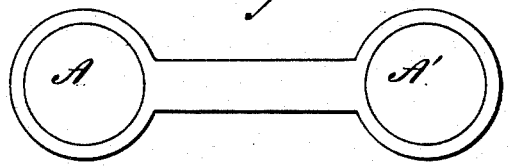
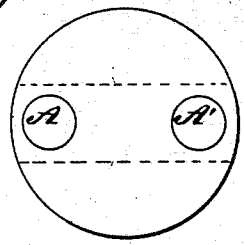
WITNESSES:
Donn Twitchell
C. Sedgwick
INVENTOR:
J. A. Smith
A. J. Athay
BY Munn & Co
ATTORNEYS.

UNITED STATES PATENT OFFICE.

JAMES A. SMITH, OF DECORAH, IOWA, AND ALFRED J. ATHAY, OF SPARLAND, ILLINOIS.

OBJECT-LENS FOR TELESCOPES AND CAMERAS.

SPECIFICATION forming part of Letters Patent No. 318,666, dated May 26, 1885.

Application filed October 22, 1884. (Model.)

*To all whom it may concern:*

Be it known that we, JAMES A. SMITH, of Decorah, in the county of Winneshiek and State of Iowa, and ALFRED J. ATHAY, of Sparland, in the county of Marshall and State of Illinois, have invented a new and useful Improvement in Object-Lenses for Telescopes and Cameras, of which the following is a full, clear, and exact description.

Our invention has a twofold object, first, to obtain the effect of a lens of large diameter without the labor and expense required for the production of large lenses; and, second, to improve photographic pictures by the use of lenses constructed according to our invention, and which serve to intensify the image and produce a stereoscopic effect in the picture. To these ends we construct a lens of compound or double form, each portion of the lens being ground to the curvature of a solid lens of the required diameter, and the two parts of the lens being held in their support so as to be retained in the same relative position with regard to each other as they would sustain in a solid lens of the same diameter and curvature.

Reference is to be had to the accompanying drawings, forming a part of this specification, in which similar letters of reference indicate corresponding parts in all the figures.

Figure 1 is a section of our improved lens, shown in the form adapted for the camera. Fig. 2 shows the same as applied to a telescope. Figs. 3 and 5 represent modifications in the construction. Fig. 4 shows a form of mounting the lens.

Referring to Figs. 1 and 2, A A' are the two parts of the compound lens. These are constructed by securing two disks of glass in the same plane and then grinding them to the curvature of a solid lens of the diameter desired, so that each part A A' is the segment of a solid lens. These are then secured or set in a frame of suitable character, so as to obtain their proper relative positions in regard to each other.

The frame or setting may consist of any suitable material and be made of any suitable form; but the material must be such as will be but little affected by heat, cold, or dampness. For telescopes the setting may be of some inferior glass, or the setting may be, as shown in Fig. 4, similar to those used in opera-glasses. The same effect and result may be obtained by taking an ordinary lens, and by diaphragms or other means rendering it opaque, except at diametrically-opposite portions, as shown in Figs. 3 and 5, these portions being equivalents of the sections or parts A A' before described. By this construction the effect of a lens of any diameter may be produced at much less expense of time and labor than would be required for the production of a solid lens of the same diameter. The image produced at the common focus of the two sections of the lens will give a photographic picture of superior character.

It is to be understood that in cameras this construction applies to the front or object lens, the condensing-lens being applied as usual.

Having thus described our invention, we claim as new and desire to secure by Letters Patent—

A lens for telescopes, cameras, &c., consisting of two separated transparent sections of a lens of a given diameter, which sections are spaced from each other such a distance that the exterior surfaces of the convex portions are concentric, and the inner surfaces of the convex portions are also concentric with each other, substantially as set forth.

JAMES A. SMITH.
ALFRED J. ATHAY.

Witnesses to the signature of James A. Smith:
C. A. MOODY,
JOSEPH SMITH.

Witnesses to the signature of Alfred J. Athay:
W. D. DE NORMANDIE,
N. W. TANNER.